United States Patent

Gang

[11] Patent Number: 5,793,534
[45] Date of Patent: Aug. 11, 1998

[54] FAST WIDE ANGLE ZOOM LENS

[75] Inventor: Geon-Mo Gang, Kyeongsangnam-do, Rep. of Korea

[73] Assignee: Samsung Aerospace Industries, Ltd., Kyeongsangnam-do, Rep. of Korea

[21] Appl. No.: 726,789

[22] Filed: Oct. 7, 1996

[30] Foreign Application Priority Data

Oct. 11, 1995 [KR] Rep. of Korea ............... 1995-34883

[51] Int. Cl.$^6$ ............... G02B 15/14; G02B 3/02; G02B 9/00
[52] U.S. Cl. ............... 359/689; 359/716; 359/740
[58] Field of Search ............... 359/689, 716, 359/740

[56] References Cited

U.S. PATENT DOCUMENTS 5,539,582 7/1996 Kohno et al. ............... 359/689

FOREIGN PATENT DOCUMENTS 63-186741 7/1988 Japan.
1-059035 3/1989 Japan.

Primary Examiner—Georgia Y. Epps
Assistant Examiner—Evelyn A. Lester
Attorney, Agent, or Firm—Finnegan, Henderson, Farabow, Garrett & Dunner, L.L.P.

[57] ABSTRACT

A fast wide angle zoom lens system for a compact camera is disclosed which comprises, from an object side, a first lens group of a negative refractive power; a second lens group of a positive refractive power; and a third lens group of a negative refractive power. When zooming is carried out from a wide angle position to a telephoto position in this system, the first, second and third lens groups are all shifted toward the object so that a distance between the first and second lens group and a distance between the second and third lens group are varied with the zoom lens system satisfying the following conditions:

$$2 < |f_1|/f_w < 20$$

$$0.30 < S_1/f_w < 0.70,$$

where $f_1$ is a focal length of the first lens group; $S_1$ is an amount of shift of the first lens group during zooming; and $f_w$ is an focal length of the overall zoom lens at the wide angle position.

10 Claims, 12 Drawing Sheets

FAST WIDE ANGLE ZOOM LENS

BACKGROUND OF THE INVENTION

(1) Field of the Invention

The present invention relates to a fast wide angle zoom lens system, and more particularly to a fast wide angle zoom lens system of compact size and high performance for a compact camera which comprises three lens groups and has a zooming ratio of 2 and F number of 2.8.

(2) Description of the Prior Art

There has been recent demand for an automatic compact camera to be of higher performance for the professional photographer. However, a conventional compact camera has not been able to meet this demand since a conventional fast lens has a short focal length and a conventional zoom lens requires a large F number of 3.5 or more. On the other hand, if a wide angle camera such as a panorama camera is used, there is a greater need for a large aperture lens.

Zoom lenses for compact cameras are generally divided into two types: a two group zooming and a three group zooming. The two group zooming has difficulty in aberration correction such as spherical aberration and coma if the lens aperture is large. Therefore, the two group zooming type is used in a camera that requires an F number of 3.5 or more in the wide angle position for a zooming ratio of about 2.

The three group zooming has two types. In the first type, the zoom lens system has, from the object side, a first lens group of a negative refractive power, a second lens group of a positive refractive power, and a third lens group of a negative refractive power. Examples of the first type are disclosed in Japanese patent laid open No. 90-238416 and No. 90-37317. Their advantages include a large aperture and high magnification. However, they have a drawback in that the overall lens system is too long for a compact camera.

In the second type, the zoom lens system has, from the object side, a first lens group of a positive refractive power, a second lens group of a positive refractive power, and a third lens group of a negative refractive power. Examples of the second type are disclosed in U.S. Pat. Nos. 4,854,682, 4,978,204 and U.S. Pat. No. 5,148,321. Their advantages include compactness and high magnification. However, their drawback of a large F number such as 3.5 or more makes them unsuitable for professional use.

SUMMARY OF THE INVENTION

In view of the prior art described above, it is an object of the present invention to provide a fast wide angle zoom lens system comprising three lens groups whose lens configuration enables a compact size and high performance.

In accordance with this and other objects of the present invention, a fast wide angle zoom lens system is disclosed. A fast wide angle zoom lens system according to the present invention comprises, from an object side, a first lens group of a negative refractive power, a second lens group of a positive refractive power, and a third lens group of a negative refractive power.

When zooming is carried out from a wide angle position to a telephoto position, the first, second and third lens groups are all shifted toward the object so that a distance between the first and second lens group and a distance between the second and third lens group are varied. The zoom lens system satisfies the following conditions:

$$2 < |f_1|/f_W < 20 \tag{1}$$

$$0.30 < S_1/f_W < 0.70, \tag{2}$$

where $f_1$ is a focal length of the first lens group, $S_1$ is an amount of shift of the first lens group during zooming, and $f_W$ is a focal length of the overall zoom lens at the wide angle position.

BRIEF DESCRIPTION OF THE DRAWINGS

The above object and feature of the present invention will be apparent from the following description of the embodiment with reference to the accompanying drawings.

DETAILED DESCRIPTION OF THE PREFERRED EMBODIMENTS

Now, the present invention will be described with reference to the embodiments shown in the accompanying drawings and in the form of the following numerical data.

A fast wide angle zoom lens system according to the present invention satisfies the following conditions:

$$2 < |f_1|/f_W < 20 \tag{1}$$

$$0.30 < S_1/f_W < 0.70, \tag{2}$$

$$0.5 < |f_3|/f_W < 0.9, \tag{3}$$

$$0.5 < f_2/f_W < 0.8 \tag{4}$$

$$0.65 < D_2/f_W < 0.90, \tag{5}$$

where $f_1$ is a focal length of a first lens group, $S_1$ is an amount of shift of the first lens group during zooming, $f_W$ is a focal length of the overall zoom lens at a wide angle position, $f_3$ is a focal length of a third lens group, $f_2$ is a focal length of a second lens group, and $D_2$ is a thickness of the second lens group.

The zoom lens system further satisfies the following conditions:

$$10 < |f_1| \times (N_{1P} - N_{1N}) < 80 \tag{6}$$

$$-50 < |f_1|/(V_{1P} - V_{1N}) < 0, \quad (7)$$

$$-4.0 < f_2 \times (N_{2P} - N_{2N}) < -1.0 \quad (8)$$

$$0.3 < f_2/(V_{2P} - V_{2N}) < 1.5, \quad (9)$$

$$0.5 < |f_3| \times (N_{3P} - N_{3N}) < 1.5 \quad (10)$$

$$-2.0 < |f_3|/(V_{3P} - V_{3N}) < -0.3, \quad (11)$$

where $N_{1P}$, $N_{2P}$, $N_{3P}$ are average refractive indices for positive refractive lenses of the first lens group, the second lens group and the third lens group, respectively; $N_{1N}$, $N_{2N}$, $N_{3N}$ are average refractive indices for negative refractive lenses of the first lens group, the second lens group and the third lens group, respectively; $V_{1P}$, $V_{2P}$, $V_{3P}$ are average Abbe numbers for positive refractive lenses of the first lens group, the second lens group and the third lens group, respectively; and $V_{1N}$, $V_{2N}$, $V_{3N}$ are average Abbe numbers for negative refractive lenses of the first lens group, the second lens group and the third lens group, respectively.

The fast wide angle zoom lens system according to the present invention further satisfies the following conditions:

$$N_{2A} > 1.7 \quad (12)$$

$$0.05 < f_{11}/f_1 < 0.25 \quad (13)$$

$$0.05 < f_{12}/|f_1| < 0.35, \quad (14)$$

where $N_{2A}$ is an average refractive index for aspherical lenses in the third lens group, $f_{11}$ is a focal length of a first lens of the first lens group, and $f_{12}$ is a focal length of a second lens of the first lens group.

An aperture is placed between the first lens group and the second lens group, or within the second lens group according to the embodiments. Furthermore, the second lens group comprises at least one aspherical lens.

Condition (1) relates to a refractive power of the first lens group. If the lower limit is not satisfied, the refractive power of the first lens group will be large, resulting in poor aberration correction during zooming. If the upper limit is not satisfied, the refractive power of the first lens group will be small, resulting in a long shift of each lens group during zooming.

Condition (2) relates to a length of the first lens group. If the lower limit of Condition (2) is not satisfied, the shift of the first lens group will be short. However, the refractive power of each lens group will be larger, so that it may be difficult to correct aberrations. If the upper limit of Condition (2) is not satisfied, aberrations will be reduced. However, it will be difficult to achieve a compact size.

If the lower limit of Condition (3) is not satisfied, the refractive power of the third lens group will be large so that the total length of the lens system will be short. However, it will be difficult to correct aberrations, especially the upper curve of the aberration. Furthermore, if the upper limit is not satisfied, the total length of the lens system will increase.

Conditions (4) and (5) relate to a refractive power and a length of the second lens group. If the lower limit of Condition (4) is not satisfied, the refractive power of the second lens group will be large, resulting in poor aberration correction during zooming. If the upper limit is not satisfied, the refractive power of the first lens group will be small, resulting in a long shift of each lens group during zooming or focusing.

If the lower limit of Condition (5) is not satisfied, the length of the second lens group will be short. However, the refractive power for each lens of the second lens group will be larger, so that it may be difficult to correct aberrations. It will also be difficult to manufacture lenses because of the lens thinness and the edge thickness. If the upper limit of Condition (5) is not satisfied, the ambient brightness will be decreased.

Conditions (6) and (7) relate to a refractive power and material of the first lens group. If the lower limits of Conditions (6) and (7) are not satisfied, a back focal length will be long so that it will be easy to implement the system. However, the refractive power of the first lens group will become large so that it will be difficult to correct spherical aberrations. On the contrary, if the upper limits of Conditions (6) and (7) are not satisfied, the total length of the lens system will be long and chromatic aberrations large.

Conditions (8) and (9) relate to a refractive power and material of the second lens group. If the lower limits of Conditions (8) and (9) are not satisfied, the shift of the second lens group will be short during focusing. However, the refractive power of the second lens group will become large so that it will be difficult to correct aberrations during zooming. On the contrary, if the upper limits of Conditions (8) and (9) are not satisfied, distortion and chromatic aberration will be large.

Conditions (10) and (11) relate to a refractive power and material of the third lens group. If the lower limits of Conditions (8) and (9) are not satisfied, chromatic aberration of magnifying will be large. If the upper limits of Conditions (10) and (11) are not satisfied, coma will be large and the shift of the third lens group will be long during zooming.

Figure 1A:
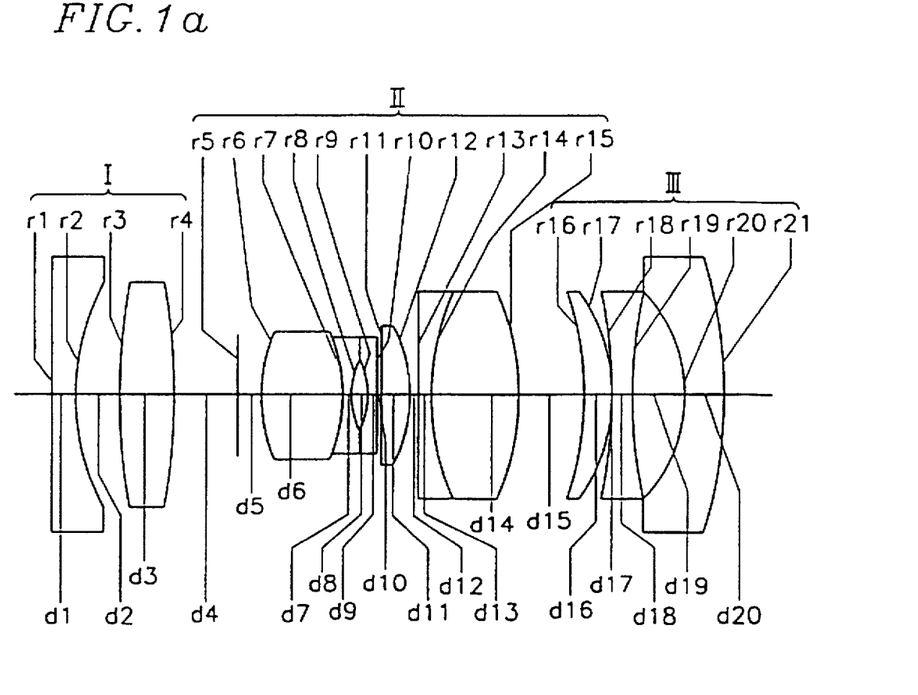
FIGS. 1(a) and 1(b) show lens configurations for a wide angle position and a telephoto position according to a first embodiment of the present invention, respectively.
Figure 1B:
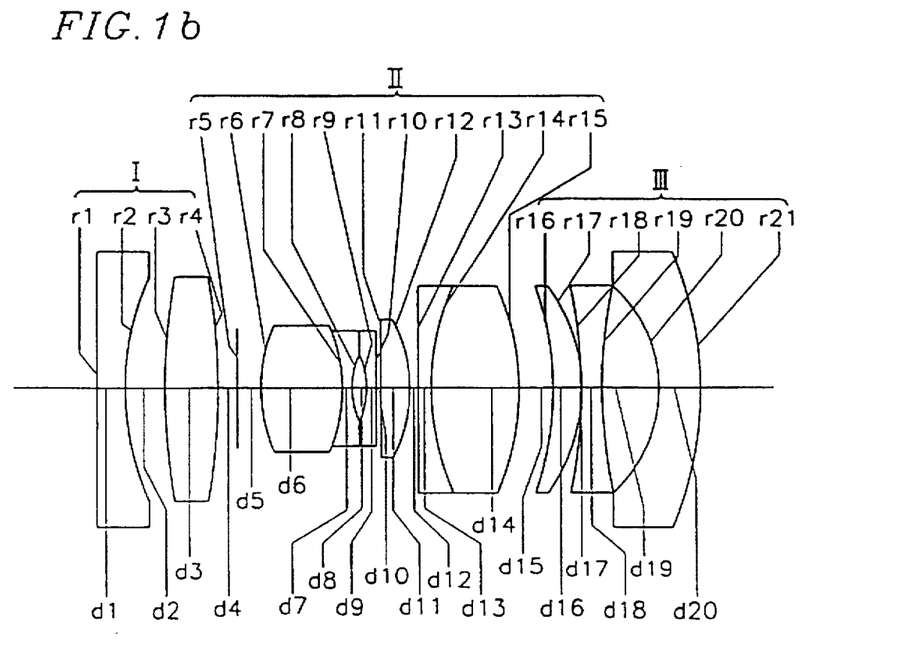
Figure 2A:
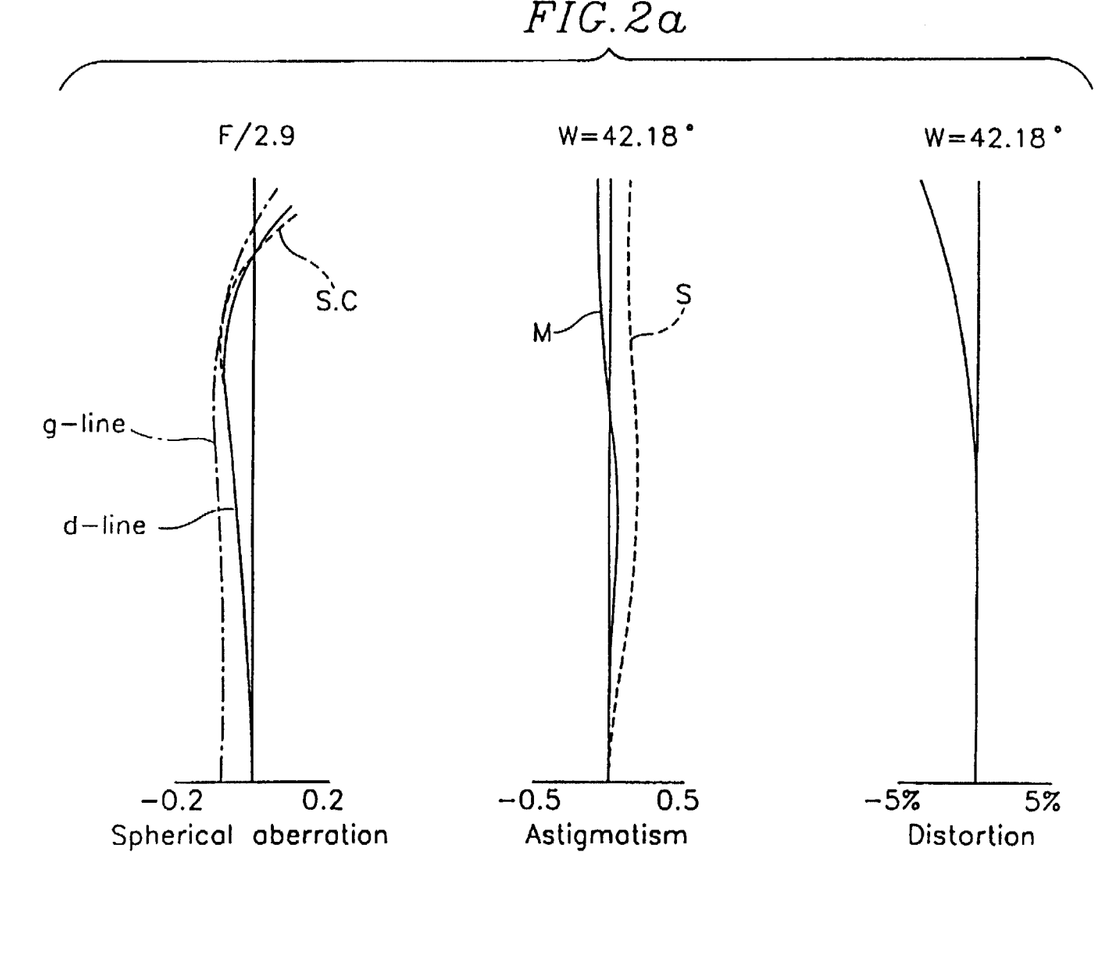
FIG. 2(a) shows diagrams illustrating lens aberrations for a wide angle position according to the first embodiment of the present invention.
Figure 2B:
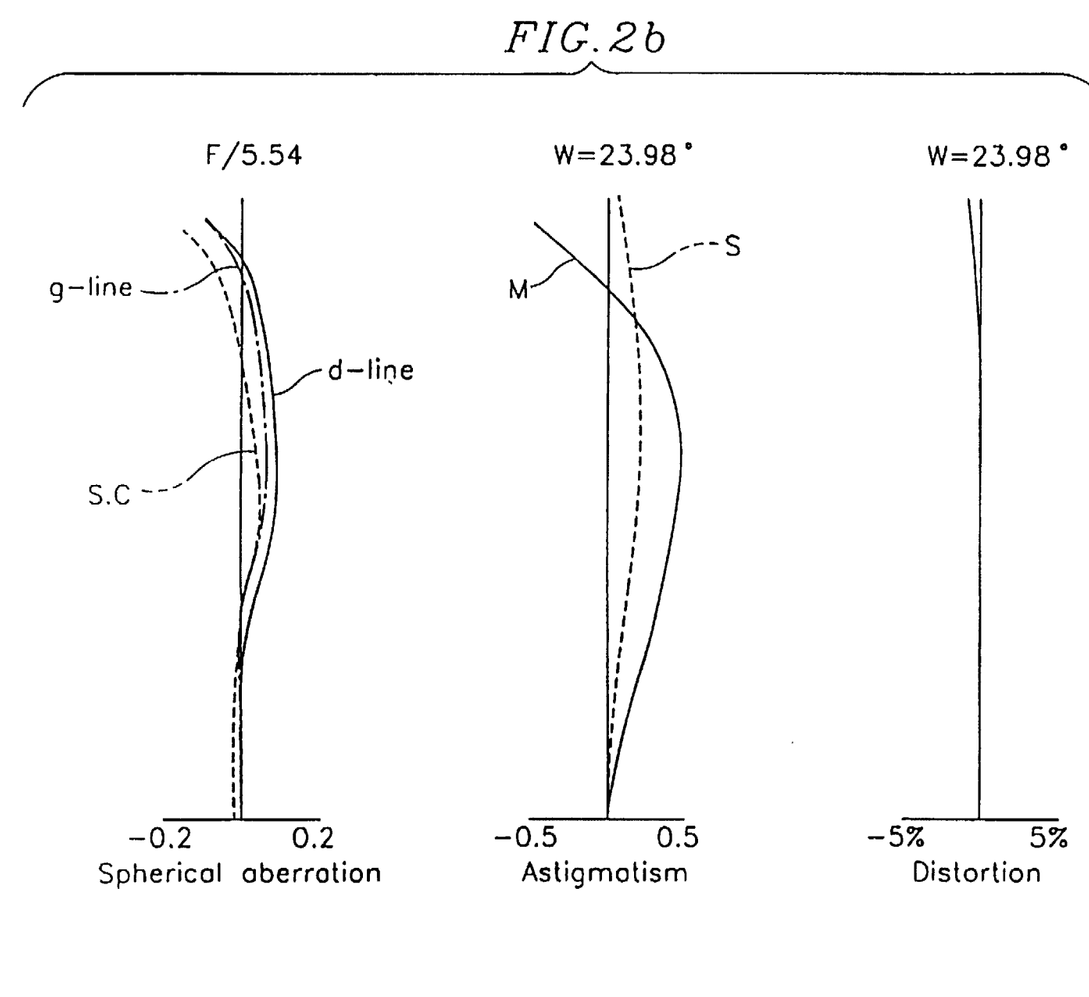
FIG. 2(b) shows diagrams illustrating lens aberrations for a telephoto position according to the first embodiment of the present invention.

FIGS. 1(a) and (b) show the lens configurations for a wide angle position and a telephoto position according to a first embodiment of the present invention, respectively. FIGS. 2(a) and (b) show diagrams illustrating lens aberrations for the wide angle position and the telephoto position according to the first embodiment, respectively. In this embodiment and other embodiments illustrated in the Figures, the object is at the left side of the lens system and the image is at the right side.

The numerical data of the first embodiment which satisfies the above Conditions (1)–(15) are shown in Table 1. The following reference symbol f represents a focal length, $f_B$ represents a back focal length, ri (i=1–21) represents a radius of curvature, di (i=1–20) represents lens thickness or distance between lenses, n represents the refractive index of each lens for sodium d-line, v represents an Abbe number of a lens, m represents the magnification of the overall lens system, and W represents a half viewing angle.

TABLE 1

| F number = 2.90–5.54 | | f = 24.657–48.859 mm | |
|---|---|---|---|
| W = 42.18°–23.98° | | $f_B$ = 6.477–31.065 mm | |

| surface No. | ri | di | n | v |
|---|---|---|---|---|
| 1 | ∞ | 1.50 | 1.73400 | 51.05 |
| 2 | 21.471 | 3.60 | | |
| 3 | 44.360 | 4.31 | 1.84666 | 23.78 |
| 4 | −177.735 | z1 | | |
| 5 | aperture | 1.24 | | |
| 6 | 19.399 | 6.74 | 1.56907 | 71.30 |
| 7 | −10.661 | 0.80 | 1.81474 | 37.03 |
| 8 | 29.196 | 0.71 | | |
| 9 | −43.933 | 1.16 | 1.79950 | 42.34 |
| 10 | −98.728 | 0.30 | | |
| 11 | −39.354 | 1.75 | 1.75700 | 47.71 |
| 12 | −15.907 | 0.10 | | |
| 13 | 66.193 | 1.00 | 1.84666 | 23.78 |
| 14 | 23.204 | 7.88 | 1.74400 | 44.90 |
| 15 | −15.849 | z2 | | |
| 16 | −41.877 | 2.50 | 1.84666 | 23.78 |
| 17 | −20.670 | 0.10 | | |
| 18 | −48.546 | 1.50 | 1.83500 | 42.98 |
| 19 | 52.874 | 6.57 | | |
| 20 | −11.942 | 1.50 | 1.77250 | 49.62 |
| 21 | −34.501 | | | |

In Table 1, distance z1 between a fourth surface and a fifth surface varies from 6.9158 to 1.0000 and distance z2 between a 15th surface and a 16th surface varies from 6.4594 to 1.1000 during zooming out from the wide angle position to the telephoto position. Further, an eighth surface and the 15th surface are aspherical surfaces. An aspherical surface is given by the following equation (q). Aspherical coefficients of equation (q) for the first embodiment are shown in Table 2.

$$Z = \frac{cS^2}{1 + \sqrt{(1 - (K+1)c^2S^2)}} + A_4S^4 + A_6S^6 + A_8S^8 + A_{10}S^{10} \quad (q)$$

$$c = 1/R, \quad S^2 = X^2 + Y^2$$

TABLE 2

|   | eighth surface | 15th surface |
|---|---|---|
| K | −0.5063335320150E +2 | 0.0000000000000 |
| $A_4$ | 0.3146318551797E −3 | 0.1298628131540E −4 |
| $A_6$ | −0.5967783187191E −5 | −0.1756483082906E −6 |
| $A_8$ | 0.1260235154036E −6 | 0.1366696885687E −8 |
| $A_{10}$ | −0.1304992173681E −8 | −0.8671899517115E −11 |

Figure 3A:
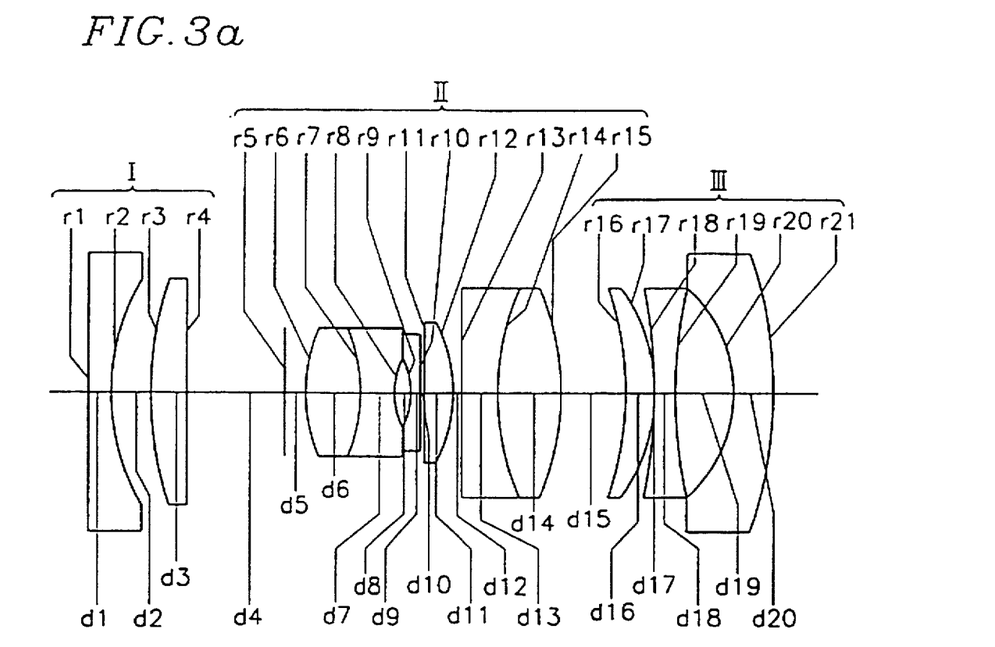
FIGS. 3(a) and 3(b) show lens configurations for a wide angle position and a telephoto position according to a second embodiment of the present invention, respectively.
Figure 3B:
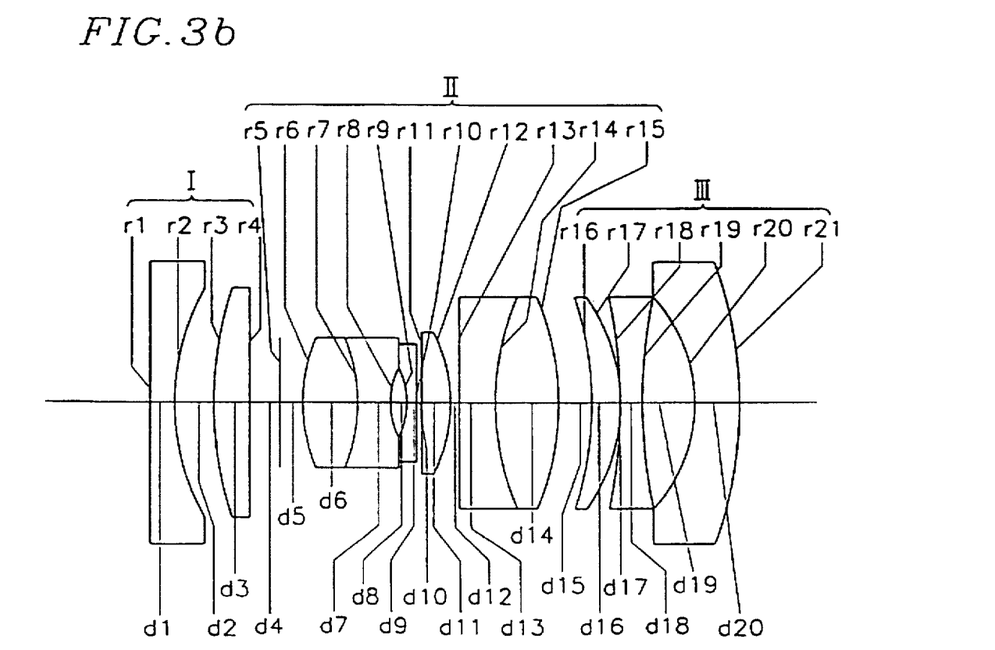
Figure 4A:
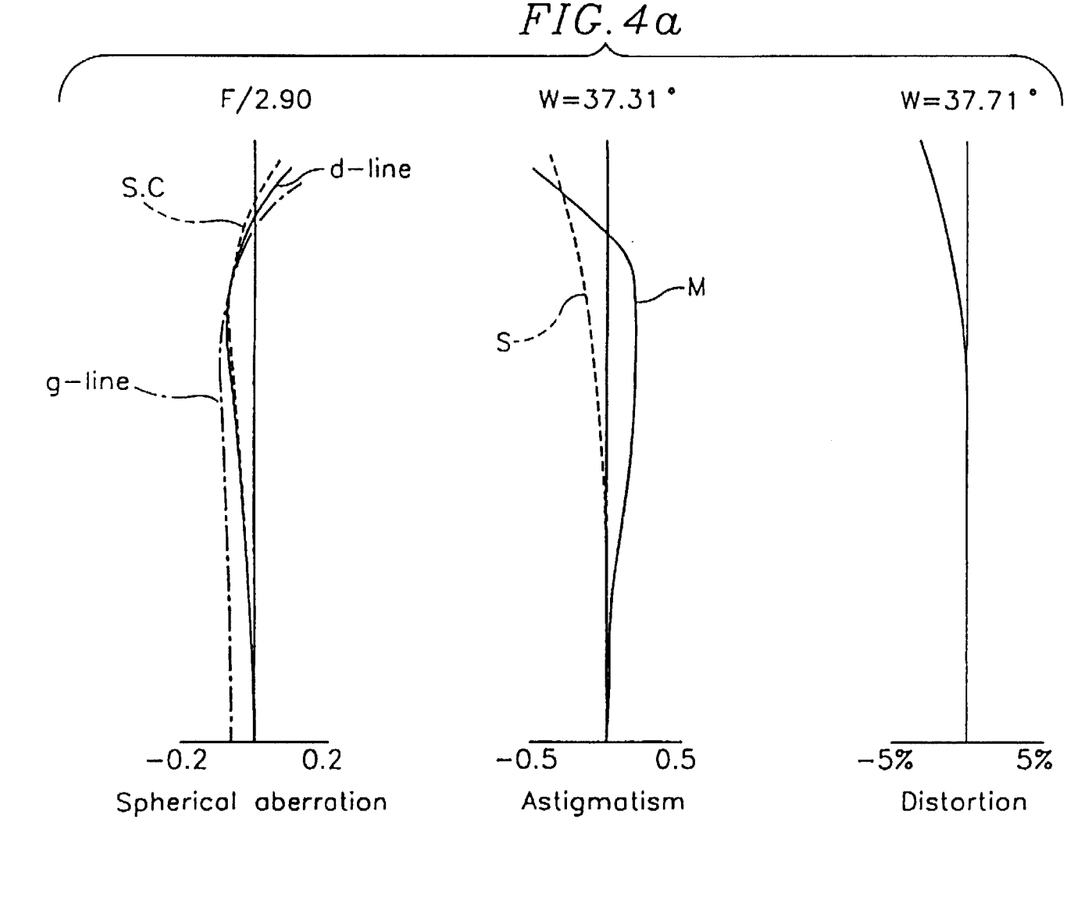
FIG. 4(a) shows diagrams illustrating lens aberrations for a wide angle position according to the second embodiment of the present invention.
Figure 4B:
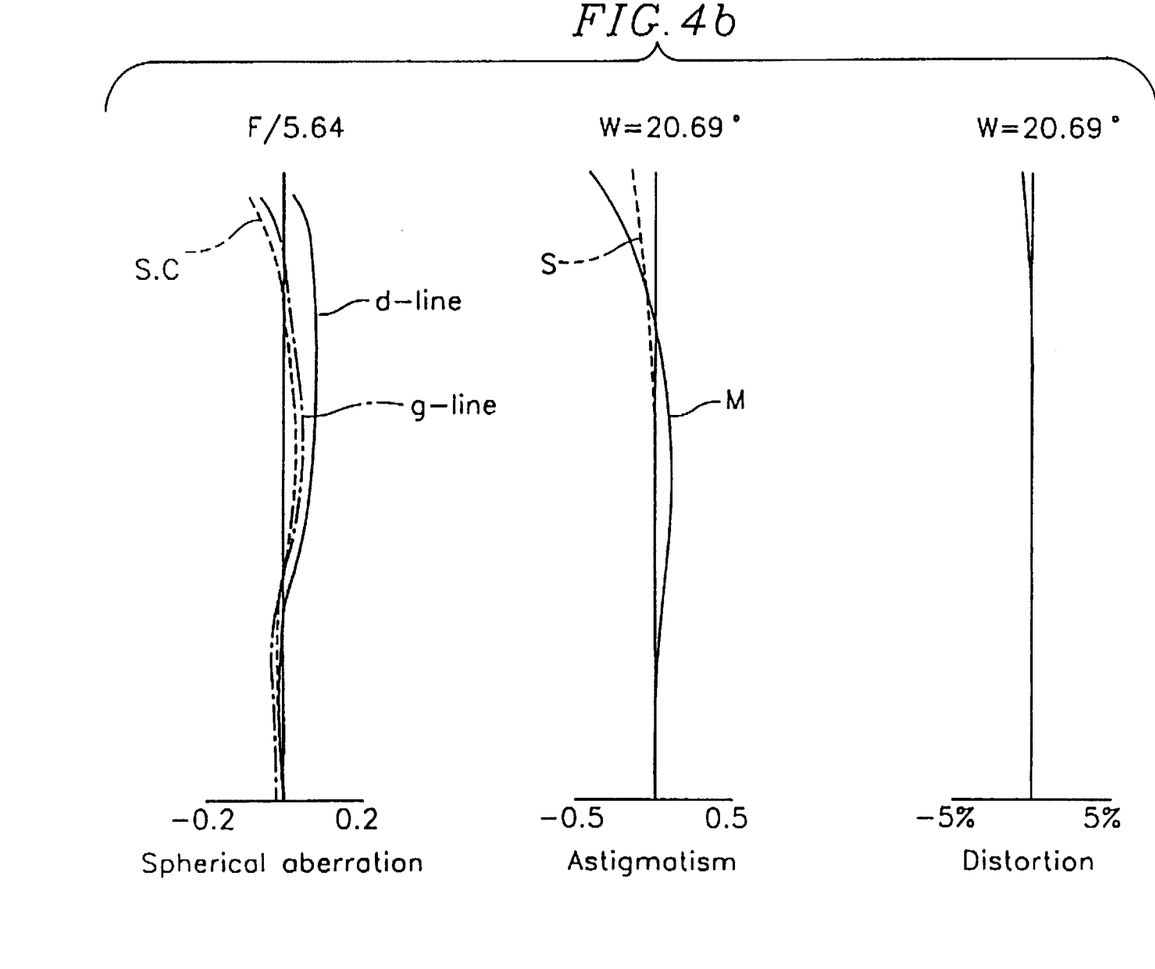
FIG. 4(b) shows diagrams illustrating lens aberrations for a telephoto position according to the second embodiment of the present invention.

FIGS. 3(a) and (b) show the lens configurations for a wide angle position and a telephoto position according to the second embodiment, respectively. FIGS. 4(a) and (b) show diagrams illustrating lens aberrations for the wide angle position and the telephoto position according to the second embodiment, respectively.

The numerical data of the second embodiment according to the present invention are shown in Table 3.

TABLE 3

F number = 2.90–5.64    f = 29.984–57.657 mm
W = 37.31°–20.69°    $f_R$ = 6.521–35.865 mm

| surface No. | ri | di | n | v |
|---|---|---|---|---|
| 1 | −472.291 | 1.76 | 1.70200 | 40.20 |
| 2 | 24.341 | 3.60 | | |
| 3 | 33.837 | 2.52 | 1.84666 | 23.78 |
| 4 | 1469.995 | z1 | | |
| 5 | aperture | 2.67 | | |
| 6 | 22.527 | 4.50 | 1.58913 | 61.25 |
| 7 | −13.461 | 3.53 | 1.81474 | 37.03 |
| 8 | 32.067 | 0.85 | | |
| 9 | −47.523 | 1.11 | 1.80518 | 25.46 |
| 10 | −140.900 | 0.29 | | |
| 11 | −53.073 | 1.77 | 1.71300 | 53.94 |
| 12 | −19.074 | 0.10 | | |
| 13 | 106.317 | 3.00 | 1.84666 | 23.78 |
| 14 | 38.450 | 5.00 | 1.74400 | 44.90 |
| 15 | −18.784 | z2 | | |
| 16 | −64.742 | 2.91 | 1.84666 | 23.78 |
| 17 | −25.928 | 0.12 | | |
| 18 | −65.354 | 1.76 | 1.79950 | 42.34 |
| 19 | 58.260 | 7.27 | | |
| 20 | −13.725 | 1.76 | 1.80420 | 46.50 |
| 21 | −40.624 | | | |

In Table 3, distance z1 between the fourth surface and the fifth surface varies from 8.7178 to 8.6421 and distance z2 between the 15th surface and the 16th surface varies from 1.5000 to 1.1785 during zooming out from wide angle position to telephoto position. Further, the eighth surface and the 15th surface are aspherical surfaces described by equation (q). Aspherical coefficients of equation (q) for the second embodiment are shown in Table 4.

TABLE 4

|   | eighth surface | 15th surface |
|---|---|---|
| K | −0.4172557500508E+2 | 0.0000000000000 |
| $A_4$ | 0.2149272994696E−3 | −0.8013642300737E−5 |
| $A_6$ | −0.2477580347496E−5 | −0.9849692443143E−7 |
| $A_8$ | 0.3917726083874E−7 | −0.4016660534087E−9 |
| $A_{10}$ | −0.2825440769875E−9 | −0.1653245428305E−11 |

Figure 5A:
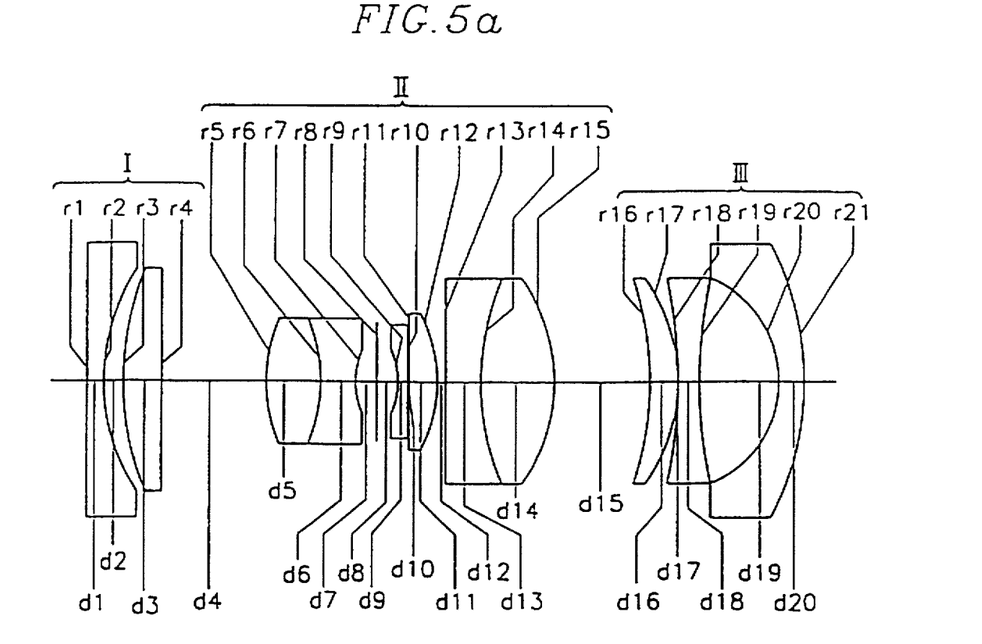
FIGS. 5(a) and 5(b) show lens configurations for a wide angle position and a telephoto position according to a third embodiment of the present invention, respectively.
Figure 5B:
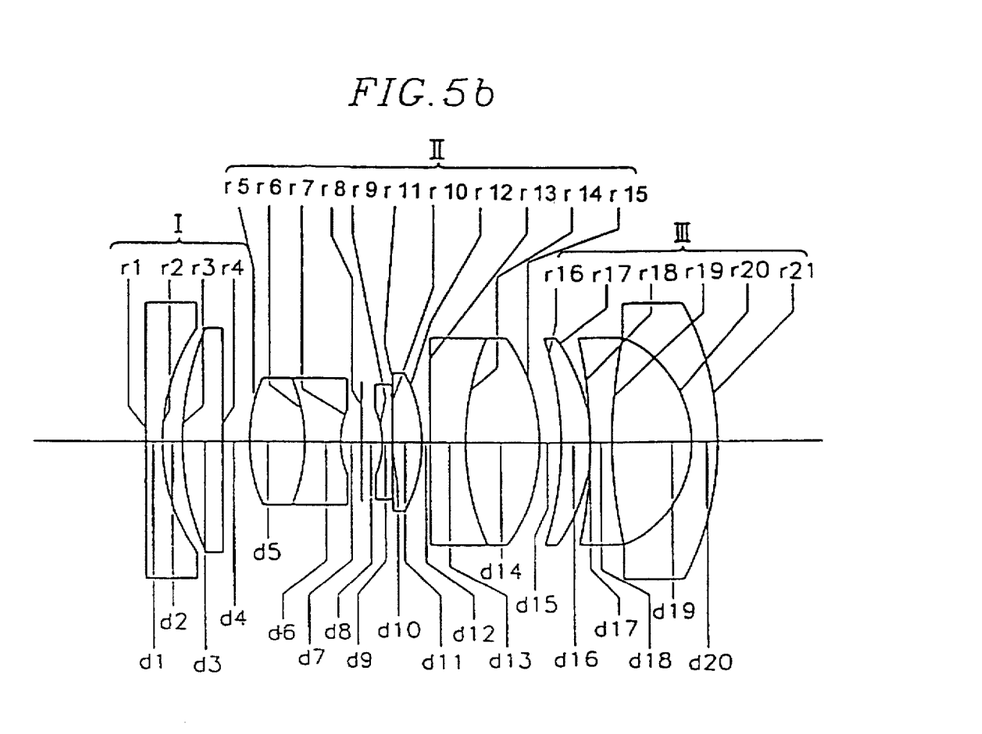
Figure 6A:
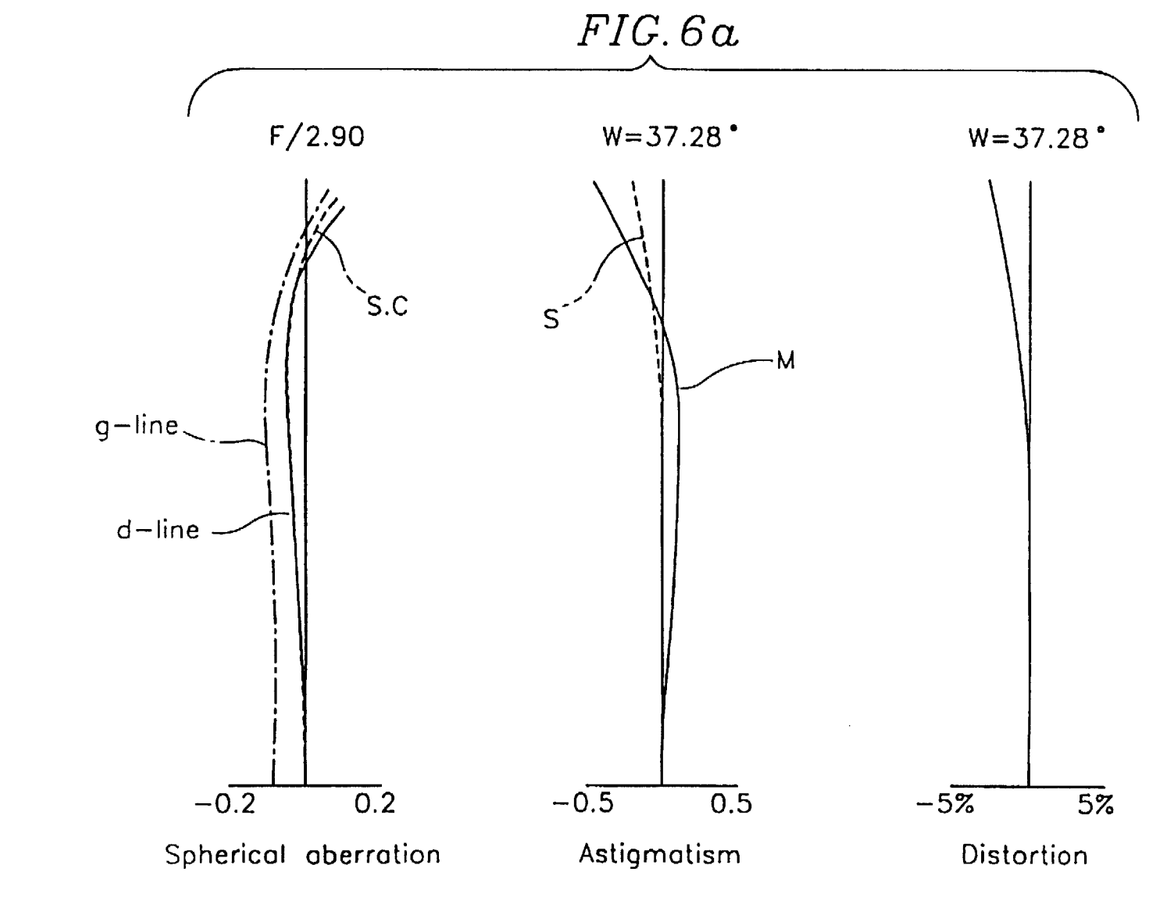
FIG. 6(a) shows diagrams illustrating lens aberrations for a wide angle position according to the third embodiment of the present invention.
Figure 6B:
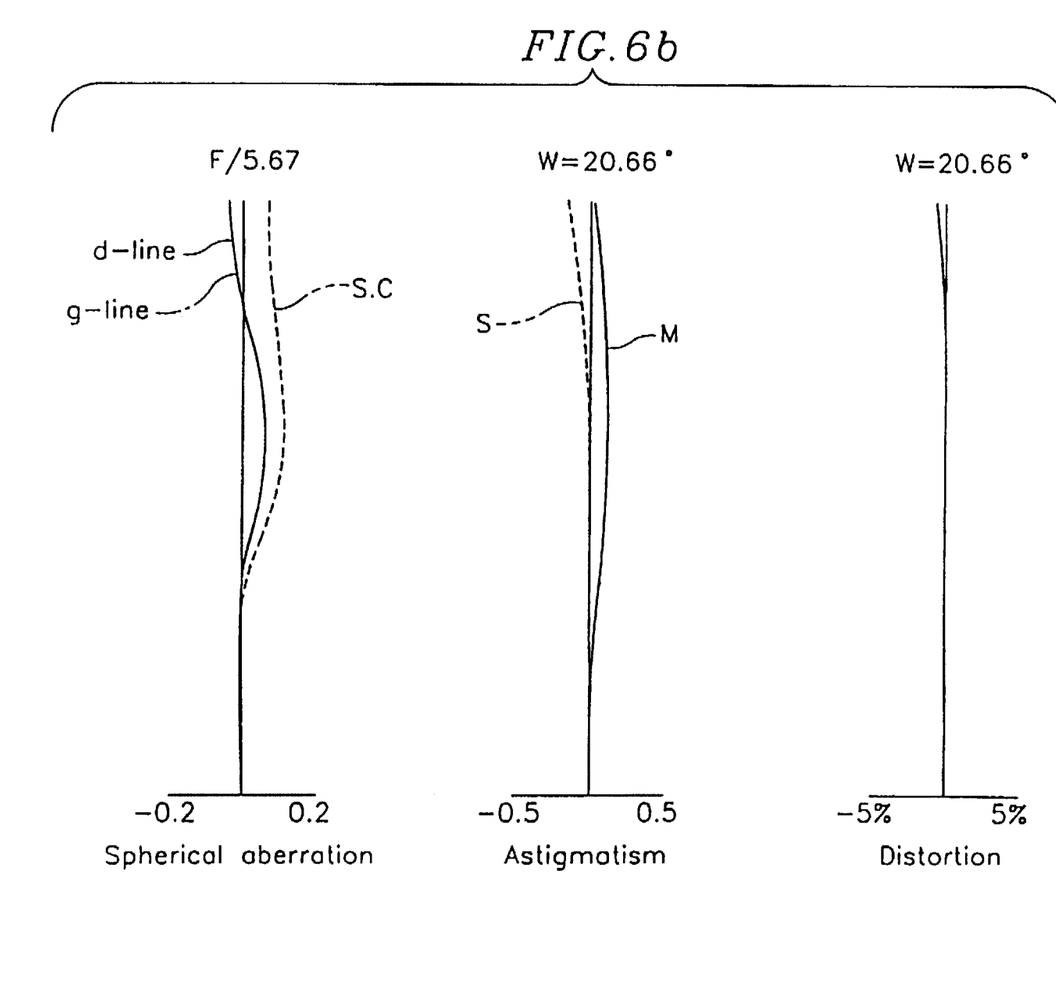
FIG. 6(b) shows diagrams illustrating lens aberrations for a telephoto position according to the third embodiment of the present invention.

FIGS. 5(a) and (b) show the lens configurations for a wide angle position and a telephoto position according to a third embodiment, respectively. FIGS. 6(a) and (b) show diagrams illustrating lens aberrations for the wide angle position and the telephoto position according to the third embodiment, respectively.

The numerical data of the third embodiment according to the present invention are shown in Table 5.

TABLE 5

F number = 2.90–5.67
W = 37.28° . 20.66°
f = 29.016–57.577 mm
$f_R$ = 6.517–35.367 mm

| surface No. | ri | di | n | v |
|---|---|---|---|---|
| 1 | −1700.958 | 1.50 | 1.69968 | 34.92 |
| 2 | 22.085 | 1.94 | | |
| 3 | 31.806 | 3.09 | 1.84666 | 23.78 |
| 4 | −529.687 | z1 | | |
| 5 | 24.852 | 4.50 | 1.58913 | 61.25 |
| 6 | −12.191 | 2.46 | 1.80610 | 40.73 |
| 7 | 32.887 | 1.50 | | |
| 8 | aperture | 1.38 | | |
| 9 | −40.560 | 1.16 | 1.80518 | 25.46 |
| 10 | −68.710 | 0.13 | | |
| 11 | −62.244 | 1.49 | 1.70200 | 40.20 |
| 12 | −19.435 | 0.52 | | |
| 13 | 90.203 | 2.00 | 1.84666 | 23.78 |
| 14 | 30.681 | 4.97 | 1.72916 | 54.67 |
| 15 | −19.461 | z2 | | |
| 16 | −64.563 | 2.50 | 1.84666 | 23.78 |
| 17 | −26.336 | 0.77 | | |
| 18 | −67.388 | 1.50 | 1.80450 | 39.64 |
| 19 | 53.230 | 6.07 | | |
| 20 | −14.130 | 1.56 | 1.80420 | 46.50 |
| 21 | −43.836 | | | |

In Table 5, distance z1 between the fourth surface and the fifth surface varies from 7.3238 to 1.0000 and distance z2 between the 15th surface and the 16th surface varies from 8.9902 to 1.4935 during zooming out from the wide angle position to the telephoto position. Further, a seventh surface and the 15th surface are aspherical surfaces described by equation (q). Aspherical coefficients of equation (q) for the third embodiment are shown in Table 6.

TABLE 6

|   | seventh surface | 15th surface |
|---|---|---|
| K | −0.5327816498608E+2 | −0.4107735281963E+1 |
| $A_4$ | 0.2242320729734E−3 | −0.6445807480540E−4 |
| $A_6$ | −0.3550688514092E−5 | 0.5146262421728E−7 |
| $A_8$ | 0.6184551245830E−7 | 0.3599939226604E−9 |
| $A_{10}$ | −0.5402275794954E−9 | 0.9369256125103E−12 |

Figure 7A:
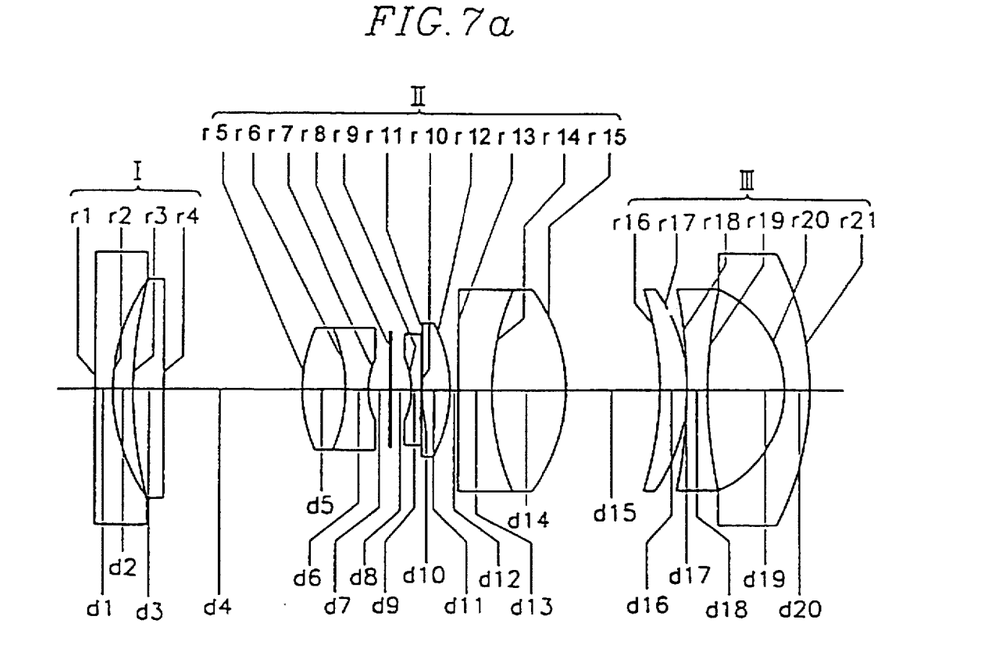
FIGS. 7(a) and 7(b) show lens configurations for a wide angle position and a telephoto position according to a fourth embodiment of the present invention, respectively.
Figure 7B:
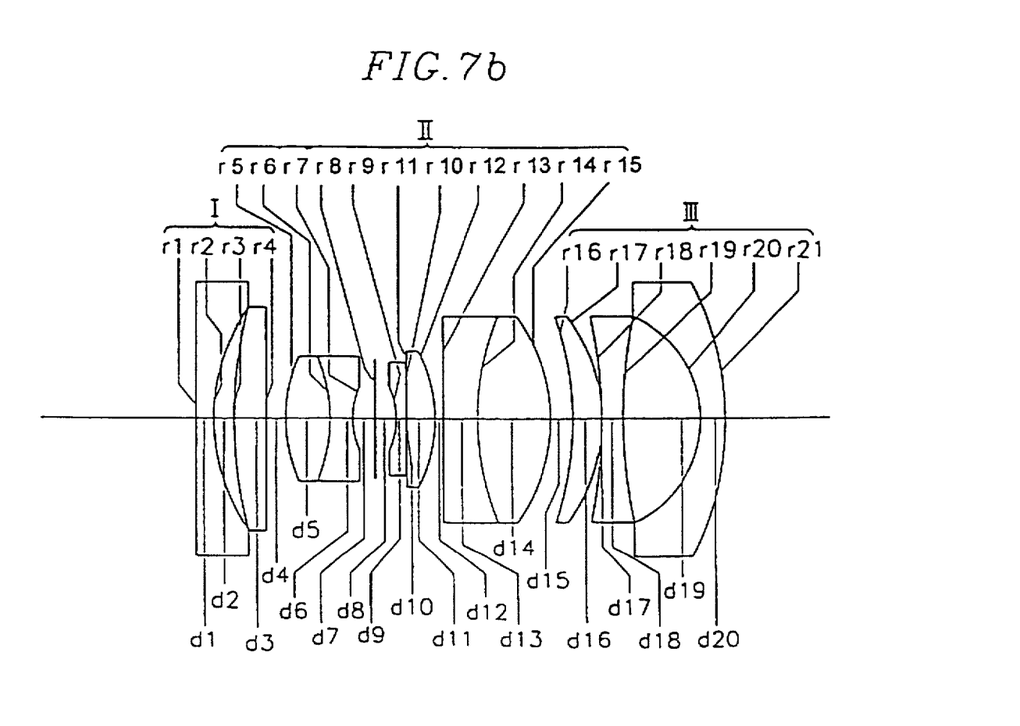
Figure 8A:
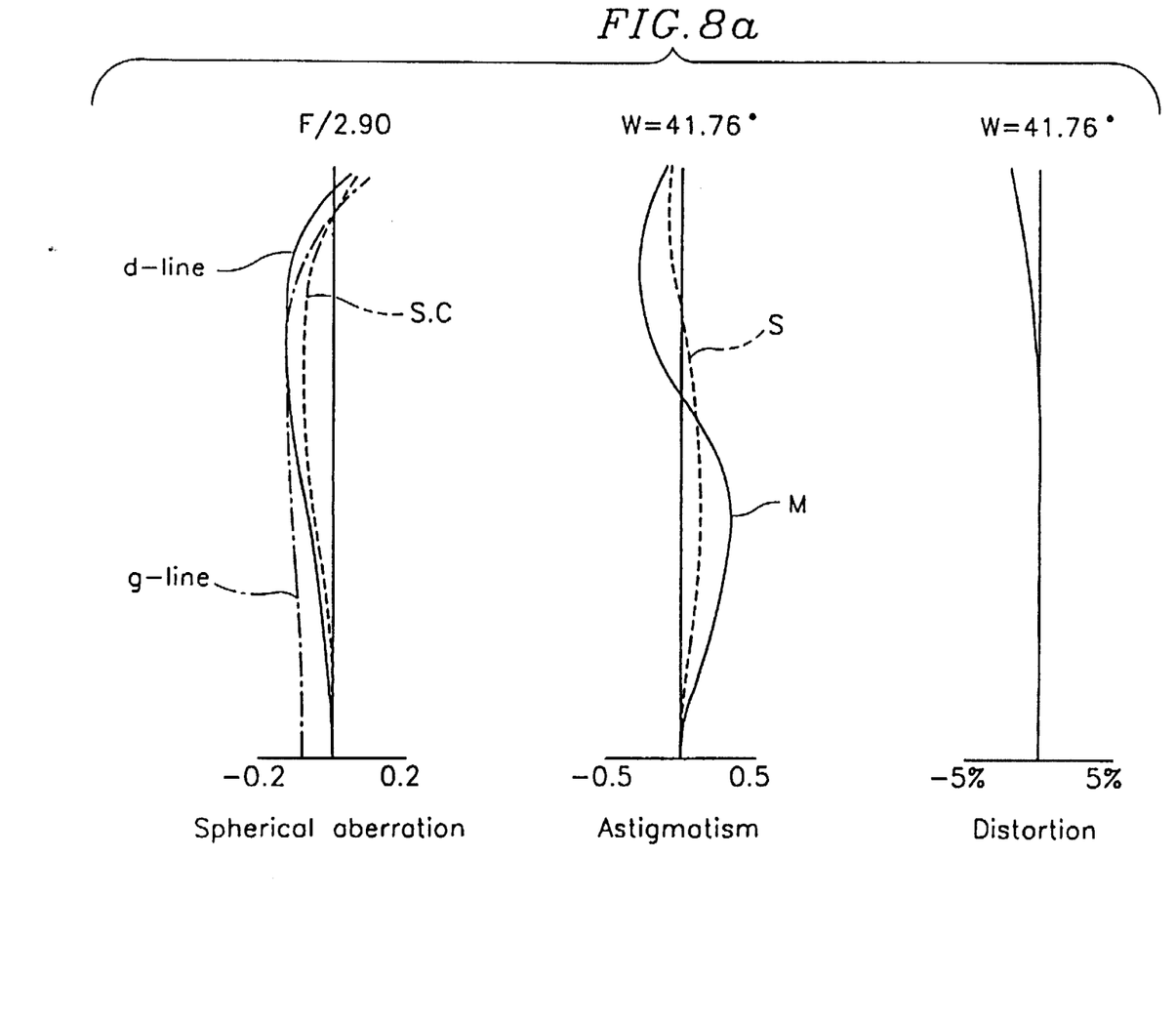
FIG. 8(a) shows diagrams illustrating lens aberrations for a wide angle position according to the fourth embodiment of the present invention.
Figure 8B:
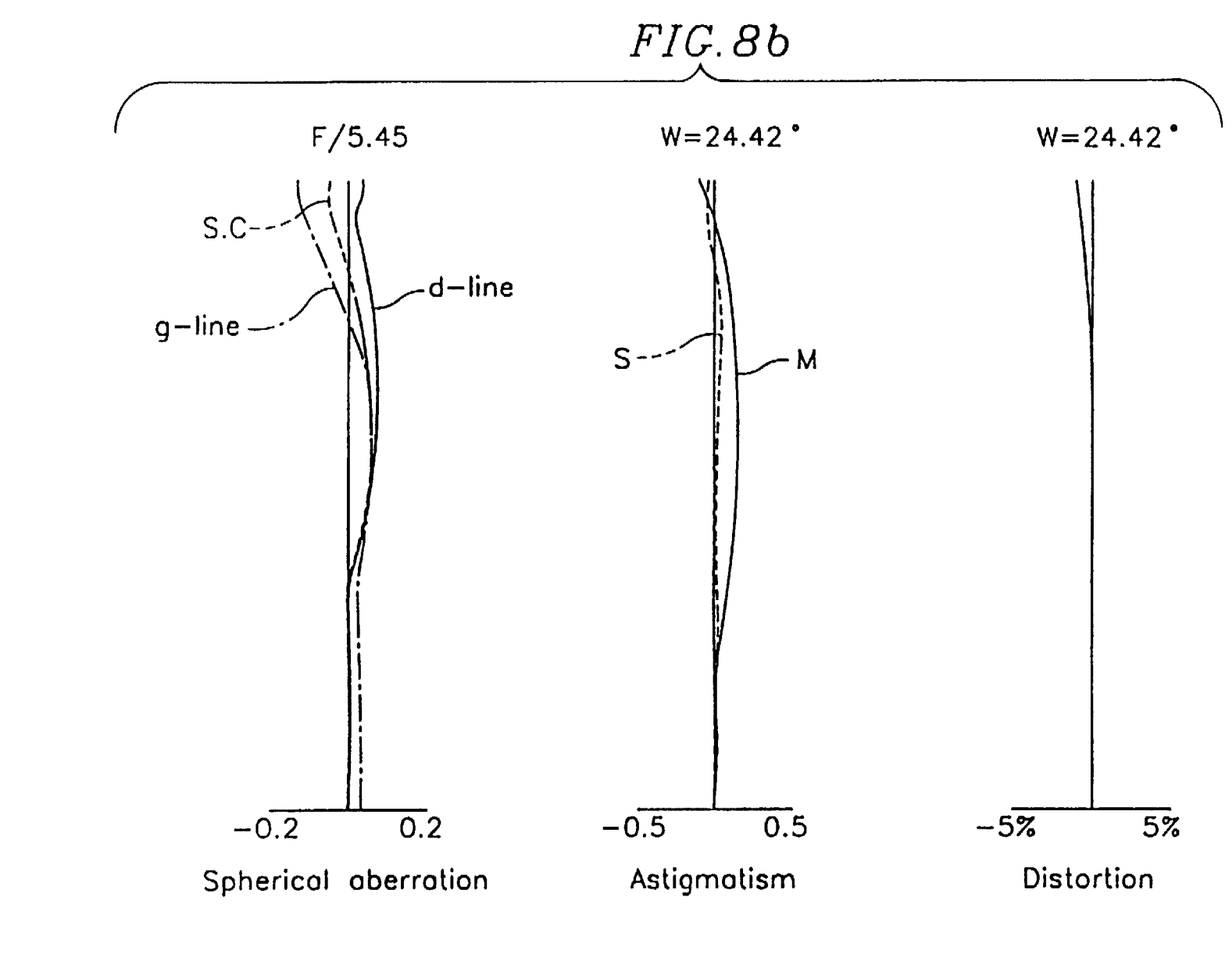
FIG. 8(b) shows diagrams illustrating lens aberrations for a telephoto position according to the fourth embodiment of the present invention.

FIGS. 7(a) and (b) show lens configurations for a wide angle position and a telephoto position according to a fourth embodiment, respectively. FIGS. 8(a) and (b) show diagrams illustrating lens aberrations for the wide angle position and the telephoto position according to the fourth embodiment, respectively.

The numerical data of the fourth embodiment according to the present invention are shown in Table 7.

TABLE 7

F number = 2.90–5.45
W = 41.76° , 24.42°
f = 24.719–48.069 mm
$f_B$ = 6.609–30.366 mm

| surface No. | ri | di | n | v |
|---|---|---|---|---|
| 1 | 138.734 | 1.50 | 1.68892 | 44.91 |
| 2 | 16.052 | 2.43 | | |
| 3 | 32.416 | 2.85 | 1.84666 | 23.78 |
| 4 | −530.419 | z1 | | |
| 5 | 22.305 | 3.49 | 1.59240 | 66.67 |
| 6 | −11.099 | 1.50 | 1.79950 | 42.34 |
| 7 | 28.922 | 1.53 | | |
| 8 | aperture | 1.30 | | |
| 9 | −48.839 | 1.23 | 1.80518 | 25.46 |
| 10 | −71.071 | 0.15 | | |
| 11 | −58.244 | 1.49 | 1.72000 | 50.34 |
| 12 | −17.960 | 0.74 | | |
| 13 | 59.422 | 2.67 | 1.84666 | 23.78 |
| 14 | 23.482 | 5.00 | 1.69350 | 53.54 |
| 15 | −16.732 | z2 | | |
| 16 | −48.609 | 2.50 | 1.84666 | 23.78 |
| 17 | −21.333 | 0.12 | | |
| 18 | −61.962 | 1.51 | 1.80450 | 39.64 |
| 19 | 45.574 | 5.93 | | |
| 20 | −11.720 | 1.50 | 1.80420 | 46.50 |
| 21 | −36.823 | | | |

In Table 7, distance z1 between the fourth surface and the fifth surface varies from 5.7535 to 6.8599 and distance z2 between the 15th surface and the 16th surface varies from 1.0000 to 1.3037 during zooming out from the wide angle position to the telephoto position. Further, the first, seventh and the 15th surfaces are aspherical surfaces described by equation (q). Aspherical coefficients of equation (q) for the fourth embodiment are shown in Table 8.

TABLE 8

| | first surface | seventh surface | 15th surface |
|---|---|---|---|
| K | 0.5438329344742E+2 | −0.2912981417094E+2 | −0.6170735905985E+1 |
| $A_4$ | −0.656223437417E−5 | 0.1928969611912E−3 | −0.1468424522712E−3 |
| $A_6$ | 0.7219504244675E−7 | −0.1724756285323E−5 | 0.1126824384675E−5 |
| $A_8$ | −0.4088911196167E−9 | 0.1133262480951E−7 | −0.9569454336483E−8 |
| $A_{10}$ | 0.7407278977319E−12 | 0.1048614616561E−9 | 0.4169232591678E−10 |

As described above, it is possible to obtain a fast wide angle zoom lens system for a compact camera which comprises three lens groups and has a zooming ratio of 2 and F number of 2.8.

While it has been shown and described what is at present considered the preferred embodiments of the invention, it will be obvious to those skilled in the art that various changes and modifications can be readily made therein without departing from the scope and spirit of the invention as defined by the appended claims.

What is claimed is:

1. A fast wide angle zoom lens system comprising, from an object side:

a first lens unit of a negative refractive power;

a second lens unit of a positive refractive power; and a third lens unit of a negative refractive power;

wherein, when zooming is carried out from a wide angle position to a telephoto position, the first, second, and third lens units are all moved toward the object so that a distance between the first and second lens units and a distance between the second and third lens units are varied, said zoom lens system satisfying the following conditions:

$$2.5 < |f_1|/f_w < 20$$

$$0.30 < S_1/f_w < 0.70, \text{ and}$$

$$\Theta_w/F_w > 20$$

where $f_1$ is a focal length of the first lens unit;

$S_1$ is an amount of shift of the first lens unit during zooming;

$f_w$ is a focal length of the overall zoom lens at the wide angle position;

$\Theta_w$ is a viewing angle at the wide angle position; and $F_w$ is an F number at the wide angle position.

2. A fast wide angle zoom lens system according to claim 1, further satisfying the following condition:

$$0.5 < |f_3|/f_w < 0.9,$$

where $f_3$ is a focal length of the third lens unit.

3. A fast wide angle zoom lens system according to claim 1, further satisfying the following conditions:

$$0.5 < f_2/f_w < 0.8$$

$$0.65 < D_2/f_w < 0.90,$$

where $f_2$ is a focal length of the second lens unit; and $D_2$ is a thickness of the second lens unit.

4. A fast wide angle zoom lens system according to claim 1, wherein the first lens unit comprises at least one positive lens and at least one negative lens, the fast wide angle zoom lens system further satisfying the following conditions:

$$10 < |f_1| \times (N_{1P} - N_{1N}) < 80$$

$$-50 < |f_1|/(V_{1P} - V_{1N}) < 0$$

where $N_{1P}$ is an average refractive index for positive refractive lenses of the first lens unit;

$N_{1N}$ is an average refractive index for negative refractive lenses of the first lens unit;

$V_{1P}$ is an average Abbe number for positive refractive lenses of the first lens unit; and $V_{1N}$ is an average Abbe number for negative refractive lenses of the first lens unit.

5. A fast wide angle zoom lens system according to claim 1, wherein the second lens unit comprises at least one positive lens and at least one negative lens, the fast wide angle zoom lens system further satisfying the following conditions:

$$-4.0 < f_2 \times (N_{2P} - N_{2N}) < -1.0$$

$$0.3 < f_2/(V_{2P} - V_{2N}) < 1.5,$$

where $N_{2P}$ is an average refractive index for positive refractive lenses of the second lens; unit;

$N_{2N}$ is an average refractive index for negative refractive lenses of the second lens unit;

$V_{2P}$ is an average Abbe number for positive refractive lenses of the second lens unit; and $V_{2N}$ is an average Abbe number for negative refractive lenses of the second lens unit.

6. A fast wide angle zoom lens system according to claim 1, wherein the third lens unit comprises at least one positive lens and at least one negative lens, the fast wide angle zoom lens system further satisfying the following conditions:

$$0.5 < |f_3| \times (N_{3P} - N_{3N}) < 1.5$$

$$-2.0 < |f_3|/(V_{3P} - V_{3N}) < -0.3,$$

where $N_{3P}$ is an average refractive index for positive refractive lenses of the third lens unit;

$N_{3N}$ is an average refractive index for negative refractive lenses of the third lens unit;

$V_{3P}$ is an average Abbe number for positive refractive lenses of the third lens unit; and $V_{3N}$ is an average Abbe number for negative refractive lenses of the third lens unit.

7. A fast wide angle zoom lens system according to claim 1, wherein an aperture is placed between the first lens unit and the second lens unit, or within the second lens unit.

8. A fast wide angle zoom lens system according to claim 1, wherein the second lens unit comprises at least one aspherical lens.

9. A fast wide angle zoom lens system according to claim 8, wherein the third lens unit comprises at least one aspherical lens, the fast wide angle zoom lens system further satisfying the following condition:

$$N_{2A} > 1.7,$$

where $N_{2A}$ is an average refractive index for aspherical lenses of the third lens unit.

10. A fast wide angle zoom lens system according to claim 8, wherein the first lens unit comprises at least two lenses satisfying the following conditions:

$$0.05 < f_{11}/f_1 < 0.25$$

$$0.05 < f_{12}/|f_1| < 0.35,$$

where $f_{11}$ is a focal length of a first lens of the first lens unit; and $f_{12}$ is a focal length of a second lens of the first lens unit.

* * * * *

UNITED STATES PATENT AND TRADEMARK OFFICE
CERTIFICATE OF CORRECTION

PATENT NO. : 5,793,534
DATED : August 11, 1998
INVENTOR(S) : Geon-Mo GANG

It is certified that error appears in the above-indentified patent and that said Letters Patent is hereby corrected as shown below:

Title Page, Item [57], line 16, "an focal" should read --a focal--.
Title page: Item [54] and Column 1, line 3, in the title, insert --SYSTEM-- after "LENS".

Claim 5, Col. 9, line 7, "lens; unit;" should read --lens unit;--.

Signed and Sealed this

Seventeenth Day of August, 1999

Attest:

Q. TODD DICKINSON

*Attesting Officer*   Acting Commissioner of Patents and Trademarks